United States Patent [19]
Harris

[11] 3,886,832
[45] June 3, 1975

[54] CUTTING APPARATUS

[75] Inventor: Michael R. Harris, Norwood, N.J.

[73] Assignee: Phillips Petroleum Company, Bartlesville, Okla.

[22] Filed: Nov. 15, 1973

[21] Appl. No.: 416,062

[52] U.S. Cl. ..................... 83/308; 83/326; 83/337
[51] Int. Cl. ..................... B23d 25/04; B26d 1/56
[58] Field of Search ............... 83/308, 326, 37, 337

[56] References Cited
UNITED STATES PATENTS

| | | | |
|---|---|---|---|
| 1,740,430 | 12/1929 | Mudd | 83/308 X |
| 2,776,006 | 1/1957 | Hampton | 83/308 X |
| 3,362,142 | 1/1968 | Crane et al. | 83/308 X |
| 3,611,848 | 10/1971 | Sullivan et al. | 82/53.1 |

FOREIGN PATENTS OR APPLICATIONS

| | | | |
|---|---|---|---|
| 907,969 | 10/1962 | United Kingdom | 83/308 |
| 610,979 | 10/1960 | Italy | 83/326 |

Primary Examiner—Andrew R. Juhasz
Assistant Examiner—W. R. Briggs
Attorney, Agent, or Firm—Neuman, Williams, Anderson & Olson

[57] ABSTRACT

A moving elongate article such as a linearly moving extruded tube is cut into a plurality of short lengths by means of a plurality of spaced cutting blades. The blades project from a continuous chain engaging opposed sprockets rotatably mounted on a supporting frame. The chain traverses a linear path segment which intersects the linear path of the extruded tube. The extruded tube is forced into a central frame portion and into engagement with at least two of the cutting blades, thereby driving the continuous chain and engaged blades about their continuous path as the extruded tube linearly moves. As the tube advances, the frame and cutting blades supported thereon are rotated by a motive means thereby enabling the blades to cut about the entire periphery of engaged tube.

3 Claims, 3 Drawing Figures

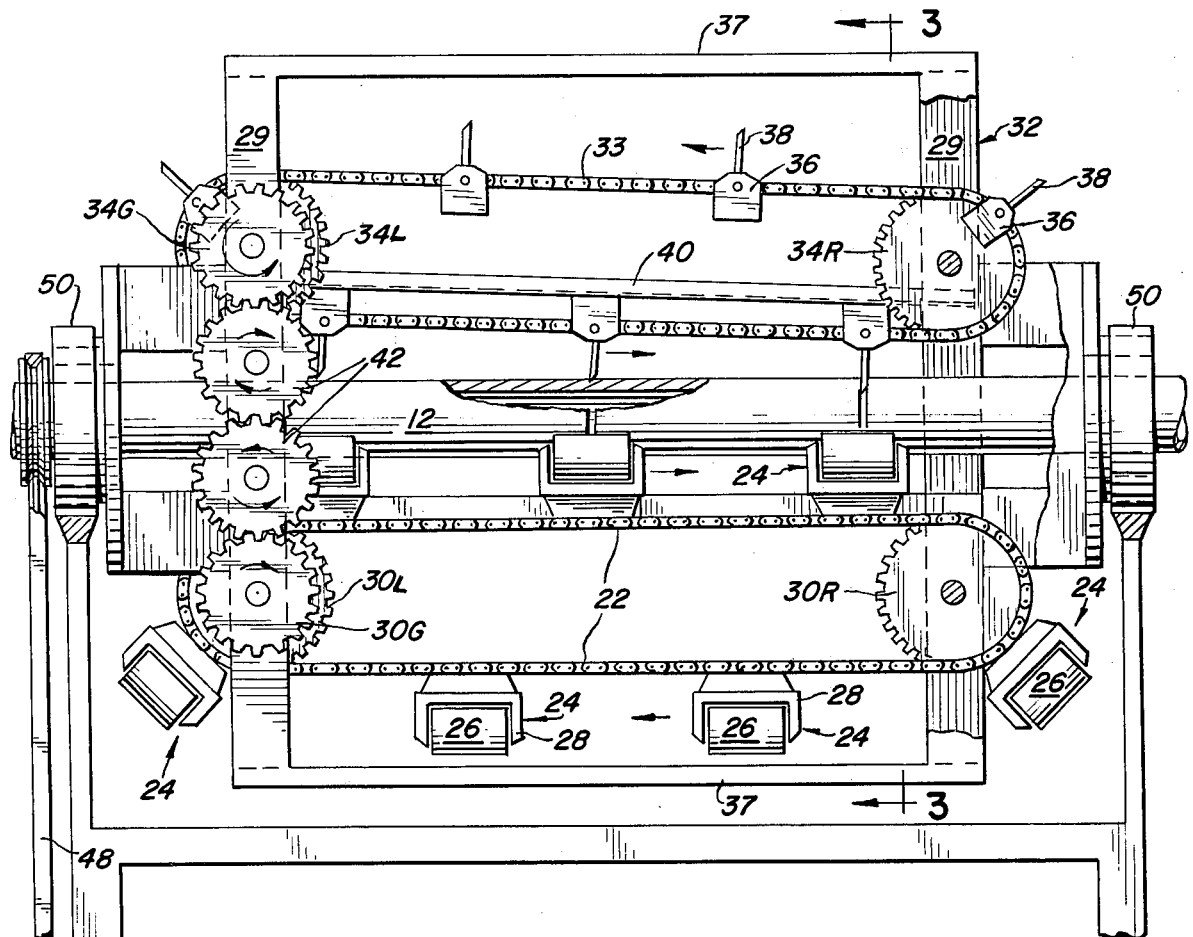
FIG. 2
FIG. 3
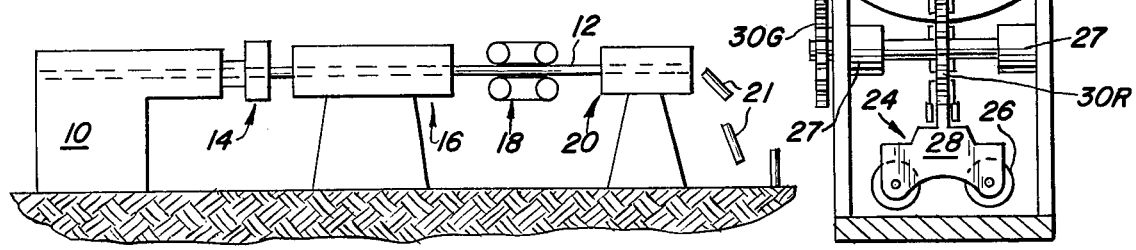
FIG. 1

CUTTING APPARATUS

BACKGROUND OF THE INVENTION

This invention relates to apparatus for cutting elongate tubular articles into shorter tubes of precise lengths. In a specific application, this invention may be employed in the continuous formation of tubular parisons from a continuously extruded thermoplastic tube.

Various prior art cutting devices exist which are adapted to cut short tubular segments of desired length from an elongate extruded tube. Many such devices, however, utilize elaborate control systems having microswitches, solenoids, air cylinders, etc., which must interact perfectly to provide the desired result of cutting the large parent tube into the shorter tubes of desired precise length. Malfunctioning in any one of the cutting device control elements could result in malfunctioning of the entire cutting apparatus and render the tubular members produced unsatisfactory for their intended purposes.

Prior art cutting devices employing controls of varying complexity are disclosed in patents such as Thorman U.S. Pat. No. 3,513,736 which issued May 26, 1970 and employs a fluid control system; Hicks U.S. Pat. No. 3,550,490 which issued Dec. 29, 1970 and employs an electric eye component in the control device utilized; and Spivy U.S. Pat. No. 3,655,856 which issued Apr. 11, 1972 and utilizes limit switches. The cutting aparatus of Hicks U.S. Pat. No. 3,363,494 which issued Jan. 16, 1968 employs concentric shafts and a linkage-operated cutting device.

SUMMARY OF THE INVENTION

It is an object of this invention to provide a method and apparatus for cutting a continuous tubular extrudate into individual workpieces of precise length without the need for intricate and expensive control devices.

It is a further object of this invention to provide a method and apparatus for reliably and accurately cutting a continuously extruded tube into a plurality of tubes of precise length utilizing chain-carried recirculating cutters mounted on a rotatable frame.

It is another object of this invention to provide a method and apparatus for cutting a continuously extruded tube into shorter lengths by means of a recirculating cutting apparatus carrying spaced cutting elements; the shorter lengths may be readily changed by altering the interval between the cutting elements disposed on the cutting apparatus.

In accordance with this invention an extruded tube is continuously formed by an extrusion die, drawn by a tubing puller through a water-cooling bath and forced along a linear path through a rotating tubing cutter. The cutter comprises a rotating frame on which are mounted spaced recirculating cutters secured to a continuous chain. Oppositely disposed to the cutters are chain-driven, tube-supporting cradle segments. The cutters are guided along a linear path angularly disposed to the path of the tube and are disposed at desired intervals corresponding to desired tube lengths. The extruded tube is rapidly cut about its entire periphery by the cutters, while moving, into smaller tubular segments of desired length.

The above and other objects of this invention will become more apparent from the following description when read in the light of the drawing in which:

FIG. 1 is a schematic side elevational view of apparatus components employed in carrying out the method steps of this invention;

FIG. 2 is a fragmentary side elevational view, partly broken away, of a rotary cutting apparatus made in accordance with this invention; and FIG. 3 is a sectional view taken on line 3—3 of FIG. 2

Referring now to the drawing and more particularly to FIG. 1, a schematic representation of apparatus for continuously forming an extruded tube from which a plurality of shorter tubes of precise length are formed is shown. Extruder 10 continuously extrudes a tubular member 12 through a die 14 after which tube 12 enters cooling tank 16 from which the tube is pulled by puller 18 and forced to enter rotating cutter 20 made in accordance with this invention in a non-rotating condition. Cutter 20 is adapted to cut the continuously extruded tube 12 into short lengths 21 of precise length. Regardless of the speed of extrusion of the tube 12, the shorter lengths are precisely formed without the need for auxiliary regulating apparatus of a complex and expensive nature.

The cutter 20 made in accordance with this invention has particular application in the formation of tubular parisons which are heated and blown into bottles after being cut from a continuously extruded thermoplastic tube.

The rotating cutter 20 comprises a lower continuous chain 22 on which are mounted at spaced intervals, tube supporting cradles or carriages 24 having spaced, twin supporting rollers 26 mounted in a yoke 28 secured to chain 22. Yoke 28 may be pinned to the links of chain 22 or secured thereto by a quick-release clamp mechanism. The rollers 26 effect supporting line contacts with peripheral portions of the continuously extruded tube 12. The line contacts may be spaced approximately 90° apart on the tube periphery as is more apparent from FIG. 3 of the drawing.

The chain 22 moves about the sprockets 30L and 30R which are journaled in bearings 27 secured to opposed plates 29 of rotatable yoke 32 (see FIG. 3).

Mounted above chain 22 is continuous chain 33 which engages spaced sprockets 34L and 34R journaled above sprockets 30L and 30R respectively in bearings 35 secured to upper inner side portions of plates 29 of yoke 32 as is also seen more clearly in FIG. 3. Secured at predetermined intervals to chain 33 are holders 36 from which cutting blades 38 project at right angles. The chain 33 traverses linear path segments disposed in the same plane but at an angle to the axis of the continuously extruded tube 12. To assist the cutters in traversing a true linear path in moving between the bottom portions of sprockets 34L and 34R as viewed in FIG. 1, holders 36 slidably engage guide rail 40. It will be seen from FIG. 2 that the angular relation between the axis of travel of tube 12 and the straight line path traversed by blades 38 assures intersection of the blades 38 with the outer periphery of the tube. As the blades move on the chain 33 from sprocket 34L to 34R in substantially the same plane as the tube, the rail 40 functions as a reinforcing track assuring increasing penetration of the blades 38 into the body of the tube 12 as the tube moves to the right in FIG. 1 simultaneously driving the chain 33 and blades mounted thereon.

In the normal course of cutter operation, tube puller 18 forces the axially moving, non-rotating tube 12 onto tube-supporting carriages 24. Simultaneously, upper peripheral portions of tube 12 will engage cutting blades 38 forcing the blades and lower run of chain 33 to move to the right as viewed in FIG. 1. Chains 33 and 22 must move in synchronism since sprockets 30L and 34L have mounted adjacent thereto gears 30G and 34G, respectively, interconnected by gears 42 thereby enabling the lower run of chain 33 and upper run of chain 22 to move to the right at substantially the same speed.

Also, simultaneously drive motor 44 mounted in a lower portion of main support frame 46 rotates yoke 32 and the apparatus components mounted thereon, including the chains 22 and 32, about the axially moving tube 12 by means of drive belt 48. Yoke 32 is supported in bearings 50 disposed at opposite upper ends of the main frame 46. Thus, as tube 12 moves to the right, the cutting blades 38 intersect the outer periphery of tube 12 at precise spaced intervals, cut the tube 12 about its entire periphery where engaging the same, thereby forming the continuously extruded tube 12 into shorter lengths of precise length. The smaller tubular segments remain of precise length regardless of the axial speed of tube 12 since it is the tube movement which drives the knives 38 axially to form the smaller tubular segments.

It will be noted from FIG. 1 that blades 38 are preferably mounted on chain 33 and carriages 24 are mounted on chain 22 so that each blade 38 is oppositely disposed to a carriage 24 when cutting into tube 12. The continuously moving tube 12 is thus adequately supported within the rotating yoke 32 about its periphery regardless of the specific angular position of the yoke 32 prior to the formation of the smaller tube segments. The directly opposed relationship of the blades and carriages may, of course, be varied if desired.

Although cutting blades 38 are illustraded in FIG. 1 in equi-spaced relation so as to form a single tube length corresponding with the blade intervals, a plurality of tube lengths may be formed during operation of the above described cutting apparatus. By appropriate spacing of the blades 38 on the chain 33, two or more tube lengths of different length may be cut from the tube 12 during a single revolution of chain 33. The holders 36 may be readily releasably clamped to desired chain links. Also, to provide for flexibility of operation the intervals between yoke plates 29 may be varied by utilizing extensible intervening yoke plates 37 to enable chains of different length to be employed in cutter 20. The link chains illustrated in the drawing are given by way of example only and equivalent continuous belts composed of materials such as rubber or wire may be employed to advantage.

Although the foregoing description was specific to an extruded tube, the elongate member to be cut by the provided apparatus may, of course, be of any cross section. The extruded member may also be of any material of composition, the blades employed in conjunction therewith being of a suitable material to cut the same.

The apparatus above described requires no complex or expensive control components. The cutters and carriages may be driven by the extruded member itself as indicated. The rotary cutter may be readily installed as an adjunct to an existing extrusion operation with a minimum of modification of the existing apparatus.

I claim:

1. A cutting apparatus comprising spaced cutting means secured at predetermined intervals to a continuous conveyor traversing a fixed path, means for axially driving a tubular member in a non-rotating condition along an axial path, said continuous conveyor and said cutting means traversing a path segment intersecting the axial path of said tubular member whereby said cutting means sequentially engage outer peripheral portions of said tubular member while proceeding along said path segment, a rotatable yoke through which said tubular member passes, supportably engaging said continuous conveyor and the cutting means mounted thereon; means connected to said yoke for rotating said yoke about said tubular member; said cutting means and continuous conveyor being substantially evenly spaced from said tubular member longitudinal axis in all positions of their rotatable movement whereby said cutting means may cut said tubular member about its entire periphery; said cutting means approaching said tubular member in the direction of tubular member axial movement whereby said cutting means penetrates said tubular member to an increasingly greater depth as said cutting means proceed along said path segment and said tubular member moves axially through said yoke.

2. A cutting apparatus comprising spaced cutting means secured at predetermined intervals to a continuous conveyor traversing a fixed path, means for axially driving a tubular member in a non-rotating condition along an axial path, said continuous conveyor and said cutting means traversing a path segment intersecting the axial path of said tubular member whereby said cutting means sequentially engage outer peripheral portions of said tubular member while proceeding along said path segment, a rotatable yoke through which said tubular member passes, supportably engaging said continuous conveyor and the cutting means mounted thereon; means connected to said yoke for rotating said yoke about said tubular member; said cutting means and continuous conveyor being substantially evenly spaced from said tubular member longitudinal axis in all positions of their rotatable movement whereby said cutting means may cut said tubular member about its entire periphery; a second continuous conveyor mounted on said yoke so as to supportably engage said tubular member when entering said yoke, said second continuous conveyor being spaced opposite to said first continuous conveyor whereby said continuous conveyors are disposed on opposite peripheral portions of said tubular member, and means interconnecting said continuous conveyors enabling movement of said continuous conveyor on which said cutting means are mounted to drive said second continuous conveyor.

3. A cutting apparatus comprising spaced cutting means secured at predetermined intervals to a continuous conveyor traversing a fixed path, means for axially driving a tubular member in a non-rotating condition along an axial path, said continuous conveyor and said cutting means traversing a path segment intersecting the axial path of said tubular member whereby said cutting means sequentially engage outer peripheral portions of said tubular member while proceeding along said path segment, a rotatable yoke through which said tubular member passes, supportably engaging said continuous conveyor and the cutting means mounted thereon; means connected to said yoke for rotating said yoke about said tubular member; said cutting means and continuous conveyor being substantially evenly spaced from said tubular member longitudinal axis in all positions of their rotatable movement whereby said cutting means may cut said tubular member about its entire periphery; a second continuous conveyor mounted on said yoke so as to supportably engage said tubular member when entering said yoke, said second continuous conveyor being spaced opposite to said first continuous conveyor whereby said continuous conveyors are disposed on opposite peripheral portions of said tubular member, and means interconnecting said continuous conveyors enabling movement of said continuous conveyor on which said cutting means are mounted to drive said second continuous conveyor and spaced tube supporting carriages secured to said continuous conveyor, the spacing of said carriages and cutting means being such on said continuous conveyors that each cutting means is disposed opposite a carriage, enabling said tubular member to be constantly supported during rotation of said yoke.

\* \* \* \* \*